No Printed Specification Available
6728X
J. French,
Bed Bottom,
Patented Aug. 25, 1831.
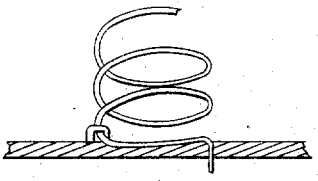
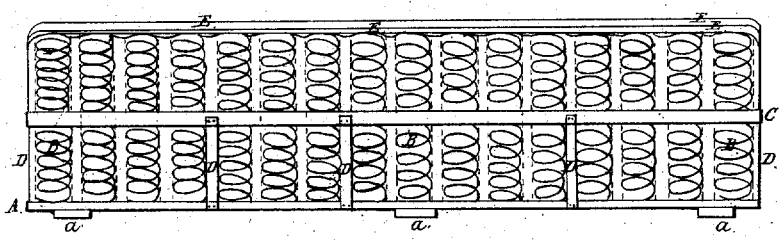
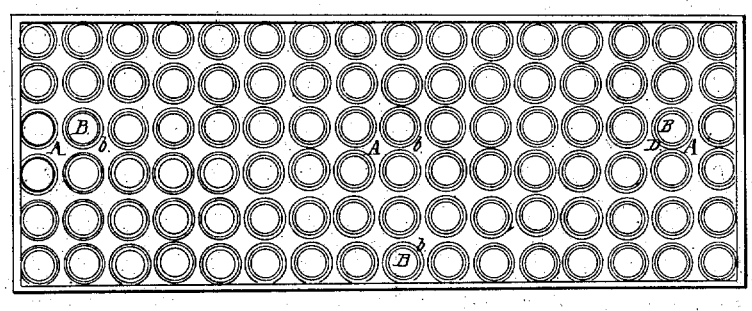
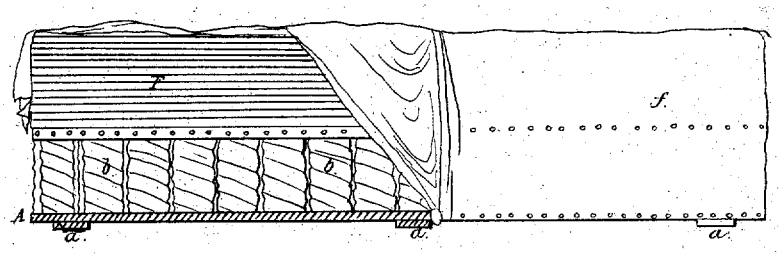
N. PETERS, PHOTO-LITHOGRAPHER, WASHINGTON, D. C.

Aug 25 1831 6728X

Josiah French Ware Massachusetts

Letters Patent

The Schedule referred to in these Letters Patent and making part of the same containing a description in the words of the said Josiah French himself of his improvement in the mode of making and manufacturing Beds by Springs. Called Spring Beds.

To all people to whom these presents shall come; Josiah French of Ware in the County of Hampshire and State of Massachusetts Gentleman Sends greeting. Be it known that I the said Josiah French have invented, Constructed, made and applied to use a new and useful improvement in making Beds called the Spring Beds Specified in the words following viz. 1st The bottom is made of boards planed and joined together with thin cleats the boards of the length and breadth which may be required for any bed. 2d The Springs are made of wire about one eighth of an inch in diameter; the wire is bent round a Cylinder which is four inches in diameter twelve times round the Cylinder is the proper height for the Springs which when taken off the Cylinder will be one and a half feet long and they can be made longer or shorter as may be required. These Springs after they are taken off the Cylinder are covered by cotton wicking being wound round them to prevent any sound of the wire.

These Springs are set on the board in the following manner viz. The bottom end of the Spring is bent down about 3/4 of an inch and a hole bored in the bottom the same size of the wire and the Springs set in and a wire Staple drawn over the wire about half way round from the place where it is set in the bottom. The Staple is to keep the Spring from turning on the bottom the Springs to [illegible] as near to each other as they can on the bottom board.

3. A frame of the size of the Bed is made to enclose the above Springs of hard tough wood one and an half inches wide and one inch thick to be put together the same size of the bottom and to be placed half way between the bottom board and the top of the Springs & attached to the bottom board by leather Straps nailed each Strap being of no other use than to prevent the frame from rising when drawing on the top covering said frame is to keep the Springs perpendicular

[illegible]

and to make the top covering 4th A covering of Cotton Batten is placed on the top of the Springs 5th A covering of stout thick duck is drawn over the above cotton Batten and nailed to the frame and nailed to the bottom board likewise 6th A thick coat of Cotton batten or any kind of Stuffing that is soft is placed on the above duck and then a covering of Cotton ticking or any thing that may be made choice of is drawn over and nailed to the bottom boards which completes the bed.

In testimony that the above is a true Specification of my said improvement as above described I have hereto set my hand and seal the eighth day of August in the Year of our Lord one thousand Eight hundred and thirty one Witnesses
John Bliss
Hyn Allen
Page M. King Josiah French

[illegible]